US005431009A

United States Patent [19]

Bauver, II

[11] Patent Number: 5,431,009

[45] Date of Patent: Jul. 11, 1995

[54] HEAT RECOVERY STEAM GENERATOR INLET DUCT

[75] Inventor: Wesley P. Bauver, II, Granville, Mass.

[73] Assignee: Combustion Engineering, Inc., Windsor, Conn.

[21] Appl. No.: 170,887

[22] Filed: Dec. 21, 1993

[51] Int. Cl.[6] .......... F02C 6/18

[52] U.S. Cl. .......... 60/39.182; 122/7 R; 138/39

[58] Field of Search .......... 60/39.182; 122/7 R, 122/155.2, DIG. 3; 138/37, 39

[56] References Cited

U.S. PATENT DOCUMENTS 4,530,311 7/1985 Mantymaki .......... 122/7 R

FOREIGN PATENT DOCUMENTS 889248 7/1949 Germany .......... 138/37

952277 3/1964 United Kingdom .......... 138/39

*Primary Examiner*—Louis J. Casaregola

*Attorney, Agent, or Firm*—Robert S. Smith

[57] ABSTRACT

A duct for joining a higher velocity application to a lower velocity application such as a heat recovery vapor generator inlet duct apparatus for installation intermediate the exhaust of an associated gas turbine and an associated heat recovery vapor generation apparatus which includes a housing having an inlet and an outlet. The housing has the inlet and the outlet axially offset with respect to each other; and apparatus for directing fluid flow from the inlet to the outlet, the apparatus for directing fluid flow including at least one array of mutually parallel flat plates in stair step relationship extending substantially across the path of gases entering the inlet. In some forms of the invention the apparatus also includes a second array of mutually parallel flat plates in stair step relationship extending substantially across the path of gases exiting through the outlet. The apparatus for directing fluid flow may further include a pressure gradient array and may have a generally L-shaped cross section defined by first and second axial portions, the first portion having a smaller cross-section than the second axial portion, the inlet being in the first portion and the outlet being in the second axial portion. The inlet and the outlet may be disposed in respective faces of the first and second portions that are opposed.

13 Claims, 1 Drawing Sheet

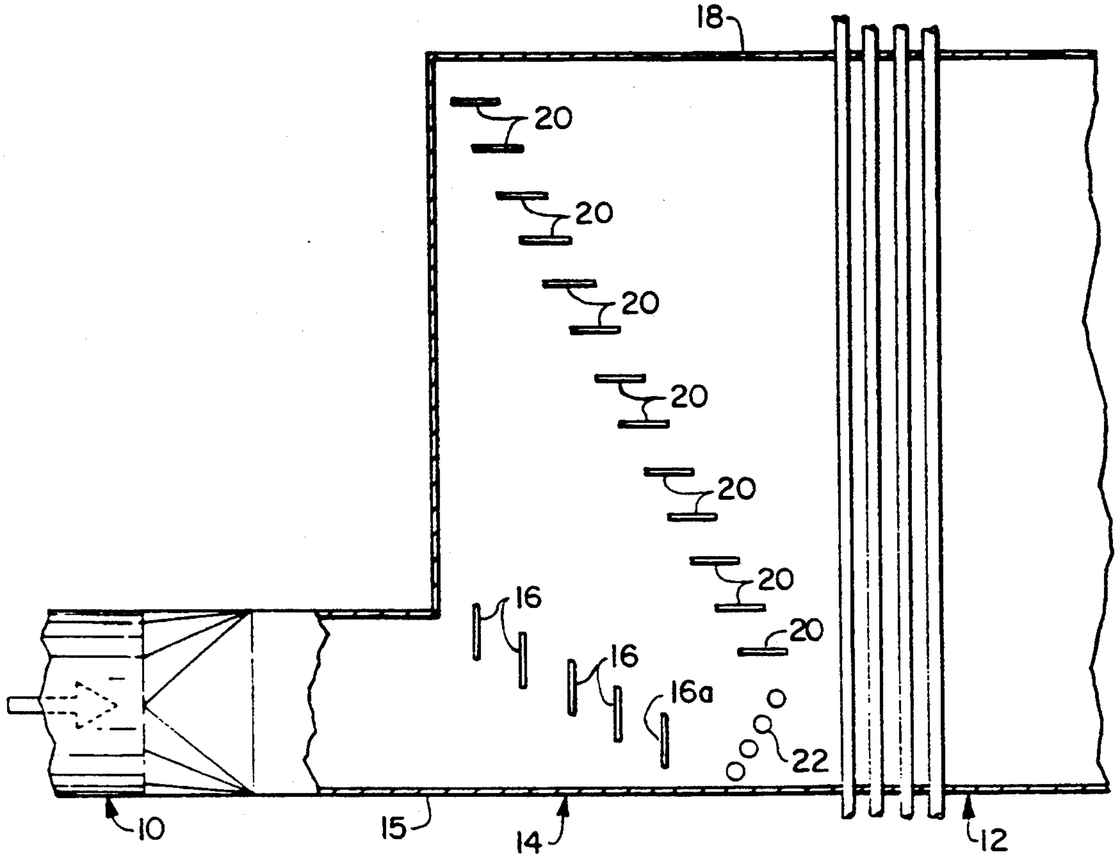
18
20
20
20
20
20
20
20
16
16
16a
22
10
15
14
12

HEAT RECOVERY STEAM GENERATOR INLET DUCT

BACKGROUND OF THE INVENTION

The invention relates to steam generation apparatus and particularly to heat recovery steam generation apparatus. Gas turbines are widely used to generate electrical power particularly to provide stand by or peak power supplements and for unattended service in remote locations. Their thermal efficiency is relatively low because of high exit gas temperatures and extremely high excess air percentages. In many cases, the thermal efficiency of a gas turbine plant can be improved by adding heat recovery equipment. More particularly, there are often economic benefits from adding either a fired or unfired steam generator to an existing gas turbine installation.

Unfired boilers have been used mainly for the production of process steam. In some applications they have been used for power generation or space heating, The conventional approach to utilizing the gas turbine exit gas has been to connect the exhaust of the gas turbine by means of a diffuser to a heat recovery steam generator. Such diffusers have a relatively long and expensive duct from the turbine to the heat recovery steam generator. While the present invention has particular application to heat recovery steam generators it will be understood by those skilled in the art to have application to other vapor generation apparatus as well as to any application where it is desired to provide a duct for a fluid, in a small space, between a high velocity application and a low velocity application. Obviously the gas turbine is one such high velocity application and the heat recovery steam generator is one such low velocity application.

The prior art includes ladder vanes that are provided to deflect gas streams for various uses includes directing gases over heat exchange surfaces. The prior art includes the use of pressure gradient arrays including the use of a plurality of pipes arranged to deflect an air stream by positioning the pipes with the respective axes thereof in a common plane which is oblique to the initial direction of gas flow. The prior art also includes the use of pipes which are spaced at non-uniform distances.

SUMMARY OF THE INVENTION

It is a primary object of the invention to provide a fluid coupling that will not impede the flow of gases out of the gas turbine.

It is an object of the present invention to provide apparatus which will be more compact and less expensive then the known apparatus.

It is another object of the present invention to provide apparatus that will slow the gases passing out of the gas turbine to a velocity that does not exceed approximately 50 feet per second.

It has now been found that these and other objects of the invention may be attained in a duct for joining a higher velocity application to a lower velocity application such as a heat recovery vapor generator inlet duct apparatus for installation intermediate the exhaust of an associated gas turbine and an associated heat recovery vapor generation apparatus which includes a housing having an inlet and an outlet. The housing having the inlet and the outlet axially offset with respect to each other; and means for directing fluid flow from the inlet to the outlet, the means for directing fluid flow including at least one array of mutually parallel flat plates in stair step relationship extending substantially across the path of gases entering the inlet.

In some forms of the invention the apparatus also includes a second array of mutually parallel flat plates in stair step relationship extending substantially across the path of gases exiting through the outlet.

The means for directing fluid flow may further include a pressure gradient array and may have a generally L-shaped cross section defined by first and second axial portions, the first portion having a smaller cross-section than the second axial portion, the inlet being in the first portion and the outlet being in the second axial portion.

The inlet and the outlet may be disposed in respective faces of the first and second portions that are opposed. The L-shaped cross-section housing may have an apex, the apparatus including a pressure gradient array disposed at the apex, the pressure gradient array comprising a plurality of substantially parallel pipes that extending substantially across the fluid flow path from the inlet to the outlet.

The apparatus may include a second array of mutually parallel flat plates in stair step relationship extending substantially across the path of gases exiting through the outlet. The means for directing fluid flow may further include a pressure gradient array. The housing may have a generally L-shaped cross section defined by first and second axial portions, the first portion having a smaller cross-section than the second axial portion, the inlet being in the first portion and the outlet being in the second axial portion.

In some forms of the invention the inlet and the outlet are disposed in respective faces of the first and second portions that are opposed. The L-shaped cross-section housing may have an apex, and the apparatus the pressure gradient array may be disposed at the apex. The pressure gradient array may comprise a plurality of substantially parallel pipes that extend substantially across the fluid flow path from the inlet to the outlet.

BRIEF DESCRIPTION OF THE DRAWING

The invention will be better understood by reference to the partly schematic sectional elevational drawing of a portion of a gas turbine and a heat recovery steam generator which are coupled together by the apparatus in accordance with the present invention.

DESCRIPTION OF THE PREFERRED EMBODIMENT

Referring now to the drawing, there is shown a portion of a gas turbine 10 and a portion of a heat recovery steam generator 12 coupled by an inlet duct 14 in accordance with the present invention. Those skilled in the art will recognize that the outlet of the gas turbine 10 will ordinarily have a circular cross section.

Ordinarily the inlet duct 14 will "flare" into a rectangular cross section although this is not essential to the invention. It is of vital importance that the inlet duct 14 in accordance with the present invention not impede the flow of gases out of the gas turbine 10. In the typical installation, the gas velocity leaving the duct inlet 14 should not exceed 50 feet per second.

The present invention achieves this result by providing a flow path that has two right angle turns. It will be seen that the gas flow will initially be horizontal as it exits the turbine 12 and enters the inlet duct 14. This portion 15 of the inlet duct 14 is provided with an array of ladder vanes 16. Each set of ladder vanes is a set of substantially flat plates that are mutually parallel, generally vertical and arrayed in a stairstep pattern to divert fluid flow. In the case of the array of ladder vanes 16 the flow exiting from the gas turbine 10 into the first axial portion 15 of the inlet duct 14 is directed into a second axial portion 18.

Adjacent vanes 16 are disposed with a uniform spacing in the preferred embodiment. In other embodiments no-uniform spacing may be utilized. Although the vanes 16 are shown as being vertical, it will be understood that for some applications some or all of the vanes 16 may all be inclined somewhat with respect to the horizontal geometric axis of the first axial portion 15.

It will be seen that the vanes 16 will direct portions of the monolithic gas stream from the gas turbine 10 into a plurality of smaller streams. In the illustrated embodiment, there are five vanes 16. In various forms of the invention the number of vanes 16 will vary for the specific installation. Thus, the flow from the gas turbine 10 will be divided into six smaller air streams. The predominate flow in the respective six five paths established by the five vanes 16 will be substantially vertical as the air from the gas turbine 10 impacts the individual vane 16 and is directed upward. The vane 16 nearest to the gas turbine 10 is disposed at the highest part of the first portion 15 of the inlet duct 14. The vane 16 furthest from gas turbine 10 is the lowest of the array of vanes 16. Stated another way, the stairstep array of vanes 16 extends across the flow path fans outwardly in a direction opposite to the direction of intended flow. More specifically, the flow path of the fluid in the first portion 15 is initially upward. The array of vanes 16 extends across the horizontal flow path to the right (as viewed) and that array fans out downwardly, as viewed, in the first portion 15. Since the ultimate direction of flow exiting the first portion 15 that is desired is upward, as viewed, it is therefore apparent that the stairstep array of vanes 16 extends across the flow path fans outwardly in a direction opposite to the direction of intended flow. More particularly, the individual vanes 16, such as vane *16a*, most remote from the gas turbine 10 is the one on the side of the flow path (the bottom as viewed in the Figure) that is opposite to the direction of ultimate flow (up as viewed in the Figure).

The substantially vertical set of six air streams flowing from the vanes 16 will strike a second array of thirteen ladder vanes 20 which will redirect the vertical gas flow from the vanes 16 into 14 fluid streams, that are generally horizontal, into the heat recovery steam generator 12. More specifically, the vanes 20 are each arranged in a mutually parallel stairstep array with adjacent vanes uniformly spaced as in the array of the vanes 16. As will be apparent from the drawing, the vane 20 that is axially closest to the heat recovery steam generator is axially spaced furthest from the exhaust of the gas turbine 10. This stairstep arrangement of the vanes 20 will direct the vertical flow emanating from the array of vanes 16 into a substantially horizontal flow path into the heat recovery steam generator 12. Stated another way, the stairstep array of vanes 20 extends across the flow path and fans outwardly in a direction opposite to the direction of intended flow. More specifically, the flow path of the fluid in the second portion 18 is initially upward. The array of vanes 20 extends across the vertically upward flow paths and that array fans out to the left, as viewed, part of the second portion 18. Since the ultimate direction of flow that is desired is to the right, as viewed, it is therefore apparent that the stairstep array of vanes 20 extends across the flow path and fans outwardly in a direction opposite to the direction of intended flow. In other words it fans out to the left as viewed in the Figure.

It will be understood that the cross section of the gas turbine 10 exhaust will ordinarily be substantially circular and that the precise cross section of the first axial portion 15 and the second axial portion 18 need not necessarily be circular and may be, for example, be substantially square, substantially rectangular or some other polygonal cross-section. Obviously it is essential that the vanes 16 and 20 substantially obstruct the transverse extent of the axial portion 15 or 18 of which the vane is a part.

The inlet duct 14 in accordance with the preferred embodiment of the invention has a generally L-shaped cross section. More particularly, the axial cross section as shown in the drawing is L-shaped. It is this L-shaped cross section in cooperation with the other aspects of the invention that results in two 90 degree turns for the gas stream passing from the turbine 10 to the heat recovery steam generator 12. It will be seen that the entire right (as viewed) side of the duct 12 is open. The smaller first axial portion has the entire left side thereof open to the exhaust from the gas turbine 10. Thus, the inlet is axially offset from the outlet and the outlet is larger than the inlet.

Disposed at substantially the apex of this generally L-shaped inlet duct 14 are additional members for deflecting flow which will be referred to collectively herein as a pressure gradient array. The pressure gradient array comprises a plurality of pipes 22 in the preferred embodiment. It will be understood that in the preferred embodiment the pipes do not carry any fluid inside the cylindrical inner portion thereof and that they serve merely as deflection members for deflecting the part of the gas stream coming from the gas turbine 10 toward the heat recovery steam generator 12. The pipes 22 extend substantially the entire transverse extent of the second axial section 18. Preferably they are not equally spaced. Preferably the respective axes of the pipes 22 are disposed in a plane that is oblique to the axis of the first axial portion 15. More particularly, the plane in which the respective axes are disposed is in a plane which is disposed at approximately a 45 degree angle with respect to the axis of the first axial portion 15. Thus, the pipe 22 that is nearest the gas turbine 10 is closest to the lowest portion of both the first axial portion 15 and the second axial portion 18. In the preferred embodiment the spacing between adjacent pipes 22 is greater near the top of the array than near the bottom of the array. This is to ensure a greater breakup of the gas stream coming from the gas turbine 10. Other embodiments may have other arrangements of the pipes 22.

It will thus be seen that the gases passing from the gas turbine 10 are broken into individual air streams by the five respective vanes 16 and directed to the vanes 20 before passing over the superheater tubes 24. In various forms of the invention the number of vanes 20 will vary for the specific installation.

The first axial portion 15 must be dimensioned and configured to avoid back pressure on the gas turbine 10. The second axial portion 18 is substantially larger than the first axial portion 15 because of the necessity for an even lower gas velocity for efficient heat transfer in the heat recovery steam generator 12.

The invention has been described with reference to its illustrated preferred embodiment. Persons skilled in the art of such devices may upon disclosure to the teachings herein, conceive other variations. For example, references herein to steam generating apparatus that will be understood to also apply to other vapor generation apparatus. Such variations are deemed to be encompassed by the disclosure, the invention being delimited only by the following claims.

Having thus described my invention, I claim:

1. A heat recovery vapor generator inlet duct apparatus for installation intermediate the exhaust of an associated gas turbine and an associated heat recovery vapor generation apparatus which comprises:

a housing having an inlet and an outlet, said inlet having a first axis and said outlet having a second axis, said first axis being parallel to and spaced apart from said second axis; and means for directing fluid flow from said inlet to said outlet, said means for directing fluid flow including at least one array of mutually parallel flat plates in stair step relationship extending substantially across the path of gases entering said inlet, said apparatus also including a second array of mutually parallel flat plates in stair step relationship extending substantially across the path of gases exiting through said outlet;

said means for directing fluid flow further including a pressure gradient array, said pressure gradient array comprising a plurality of substantially parallel pipes that extends substantially across the fluid flow path from said inlet to said outlet.

2. The apparatus as described in claim 1, wherein:

said housing has a generally L-shaped cross section defined by first and second axial portions, said first portion having a smaller cross-section than said second axial portion, said inlet being in said first portion and said outlet being in said second axial portion.

3. The apparatus as described in claim 2, wherein:

said inlet and said outlet are disposed in respective faces of said first and second portions that are opposed.

4. The apparatus as described in claim 3, wherein:

said L-shaped cross-section housing has an apex, said apparatus including a pressure gradient array disposed at said apex, said pressure gradient array comprising a plurality of substantially parallel pipes that extends substantially across the fluid flow path from said inlet to said outlet.

5. A duct apparatus for installation intermediate an associated first and second apparatus where the first apparatus uses air at a higher velocity than the second apparatus which comprises:

a housing having an inlet and an outlet, said inlet having a first axis and said outlet having a second axis, said first axis being parallel to and spaced apart from said second axis; and means for directing fluid flow from said inlet to said outlet, said means for directing fluid flow including at least one array of mutually parallel flat plates in stair step relationship extending substantially across the path of gases entering said inlet, said apparatus also includes a second array of mutually parallel flat plates in stair step relationship extending substantially across the path of gases exiting through said outlet;

said means for directing fluid flow further including a pressure gradient array, said pressure gradient array comprising a plurality of substantially parallel pipes that extend substantially across the fluid flow path from said inlet to said outlet.

6. The apparatus as described in claim 5, wherein:

said housing has a generally L-shaped cross section defined by first and second axial portions, said first portion having a smaller cross-section than said second axial portion, said inlet being in said first portion and said outlet being in said second axial portion.

7. The apparatus as described in claim 6, wherein:

said inlet and said outlet are disposed in respective faces of said first and second portions that are opposed.

8. The apparatus as described in claim 7, wherein:

said L-shaped cross-section housing has an apex, said apparatus including a pressure gradient array disposed at said apex.

9. A heat recovery vapor generator inlet duct apparatus for installation intermediate the exhaust of an associated gas turbine and an associated heat recovery vapor generation apparatus which comprises:

a housing having an inlet and an outlet, said housing having said inlet and said outlet axially offset with respect to each other; and means for directing fluid flow from said inlet to said outlet, said means for directing fluid flow including at least one array of mutually parallel flat plates in stair step relationship extending substantially across the path of gases entering said inlet;

said apparatus further including a second array of mutually parallel flat plates in stair step relationship extending substantially across the path of gases exiting through said outlet;

said housing having a generally L-shaped cross section defined by first and second axial portions, said first portion having a smaller cross-section than said second axial portion, said inlet being in said first portion and said outlet being in said second axial portion.

10. The apparatus as described in claim 9, wherein:

said inlet and said outlet are disposed in respective faces of said first and second portions that are opposed.

11. The apparatus as described in claim 10, wherein:

said L-shaped cross-section housing has an apex, said apparatus including a pressure gradient array disposed at said apex, said pressure gradient array comprising a plurality of substantially parallel pipes that extending substantially across the fluid flow path from said inlet to said outlet.

12. The apparatus as described in claim 9, wherein:

said means for directing fluid flow further includes a pressure gradient array, said pressure gradient array comprising a plurality of substantially parallel pipes that extending substantially across the fluid flow path from said inlet to said outlet.

13. The apparatus as described in claim 12, wherein:

said L-shaped cross-section housing has an apex, said apparatus including a pressure gradient array disposed at said apex.

* * * * *